Dec. 21, 1965 P. BROCHIER ETAL 3,225,260
MODULAR PACKAGE UNIT FOR ELECTRICAL COMPONENTS
Filed July 10, 1963 6 Sheets-Sheet 1

Inventors:
Pierre Brochier
Ronald Kloos
and
Jean Henri Corquart
BY Baldwin & Wight
Attorneys Inventors:
Pierre Brochier
Ronald Kloos
and
Jean Henri Cocquart
BY Baldwin & Wight
Attorneys Inventors:
Pierre Brochier
Ronald Kloos
and
Jean Henri Corquart
BY Baldwin & Wight
Attorneys

MODULAR PACKAGE UNIT FOR ELECTRICAL COMPONENTS

Filed July 10, 1963 6 Sheets-Sheet 4

Inventors:
Pierre Brochier
Ronald Kloos
and
Jean Henri Cocquart
BY Baldwin & Wight
Attorneys

MODULAR PACKAGE UNIT FOR ELECTRICAL COMPONENTS

Inventors:
Pierre Brochier
Ronald Kloos
and
Jean Henri Cocquart
BY Baldwin & Wight
Attorneys Inventors:
Pierre Brochier
Ronald Kloos
and
Jean Henri Cocquart
BY Baldwin & Wight
Attorneys United States Patent Office 3,225,260

Patented Dec. 21, 1965

3,225,260

MODULAR PACKAGE UNIT FOR ELECTRICAL COMPONENTS

Pierre Brochier, Paris, Ronald Kloos, Argenteuil, and Jean Henri Cocquart, La Courneuve, France, assignors to Compagnie des Machines Bull (Societe Anonyme), Paris, France Filed July 10, 1963, Ser. No. 293,955
Claims priority, application France, July 18, 1962, 904,312
11 Claims. (Cl. 317—101)

Figure 2:
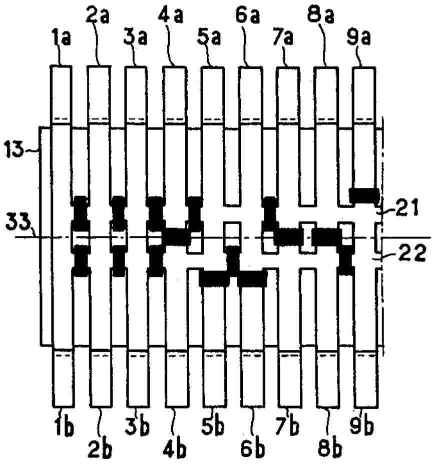

The present invention relates to improvements in modular package units for the assembly of electronic components.

In information-processing apparatus of high capacity, endeavours have been made to construct in the form of compact blocks the various functional devices which can be standardised by reason of their large number. Each block comprising a number of functional devices of the same type must be capable of being rapidly replaced and is for this reason provided with pins by which it can be plugged into a connector socket. It is obviously of primordial importance that the form of block adopted should be of low cost and of minimum overall dimensions, within the limits permitted by the electric energy dissipated in the course of the operation.

Hitherto, a fairly wide use of printed-circuit cards has not enabled optimal economy and dimensions to be attained.

On the other hand, if the assembly of electric and electronic components by means of electric resistance welding is contemplated, numerous advantages can be derived therefrom. Since resistance welding is a process in which the parameters can be adjusted with precision on the welding machine, the welds are of uniform quality. Since the conductor wires heat up in a very short time, the wires connecting the resistances, condensers and semiconductor members can be reduced to minimal length. Semiconductor bodies are not likely to be impaired by prolonged heating, as is the case with soldering.

Finally, electric resistance welding makes it possible to mechanise the operation of assembling the electric components, and such mechanisation can be more extensively applied as the number of units to be manufactured is considerable. This is obviously true above all with cylindrical components comprising two axial wires, and the dimensions of which are substantially of the same order of magnitude. With regard to transistors with their three wires, electric welding requires some manual preparation.

The advantages of the block or modular package designed in compact form in accordance with the invention arise primarily out of the fact that the assembly of the wires of the components is effected solely by electric welding on a machine provided for this purpose.

Thus, in accordance with the invention, a modular package can be constructed around a modular package unit essentially composed of a set of conductive strips disposed parallel to one another with a uniform pitch, from a grid or lattice of a model common to all the parts employed in one technological field, which set of strips comprises a plane central web, the strips on either side of said web being first bent into U-shaped form and then bent into a plane parallel to the web so as to form two series of electric welding surfaces for the rectilinear wires of the components in the proportion of one component to the ends of a common strip, central portions of the web being generally interrupted along its axis, except when it is necessary to retain an electric connection between two aligned or offset strips, in accordance with the requirements of the circuit to be produced.

In addition, the ends of the said strips which extend beyond the said welding surfaces may also be bent over substantially perpendicularly to the plane of the web and oppositely to the latter in order to enable additional welded connections to be made.

A compact block or modular package can be composed of at least two modular package units as hereinbefore defined, which are fixed in parallel relationship and in proximity to one another, so that some of the bent-over end strips are parallel and opposite to one another in order to be electrically welded.

Figure 1:
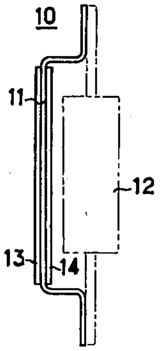
Figure 4:
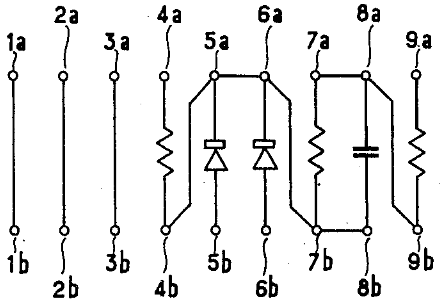
Figure 3:
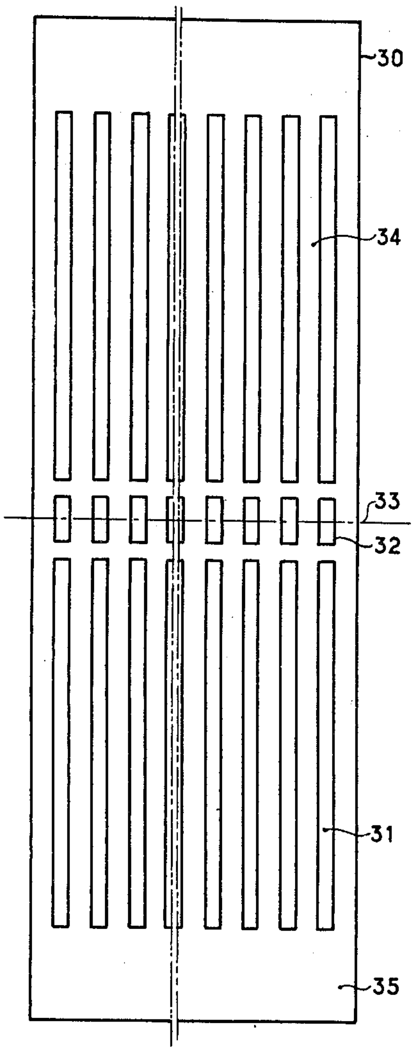
Figure 5C:
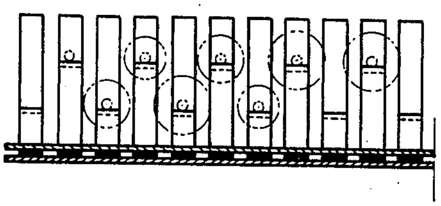
Figure 5B:
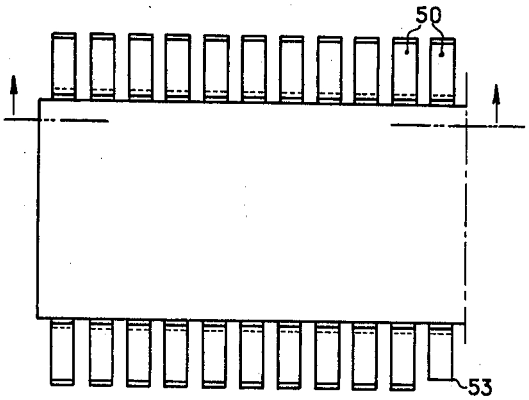
Figure 5A:
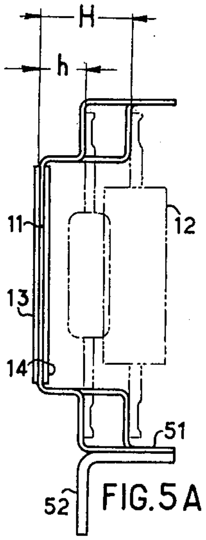
Figure 6B:
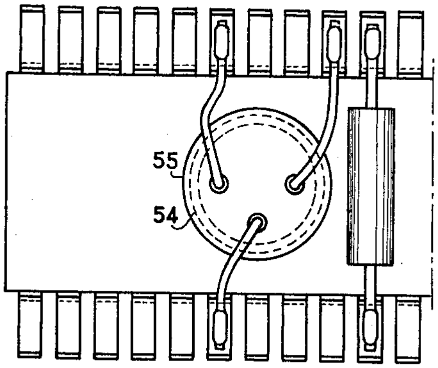
Figure 6A:
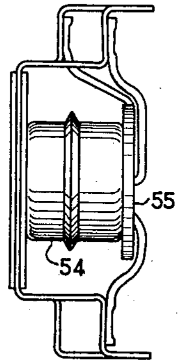
Figure 7A:
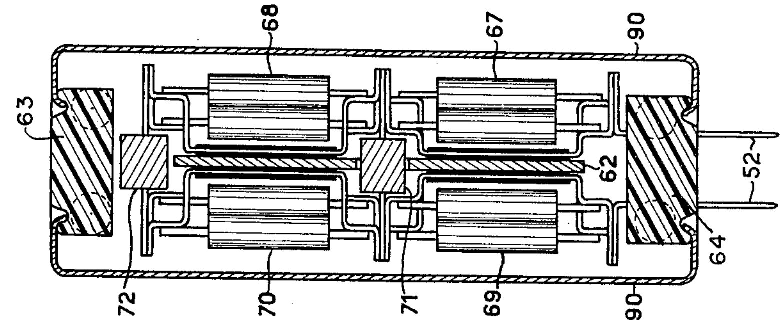
Figure 7C:
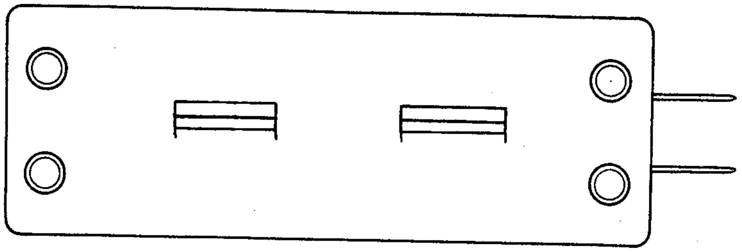
Figure 7B:
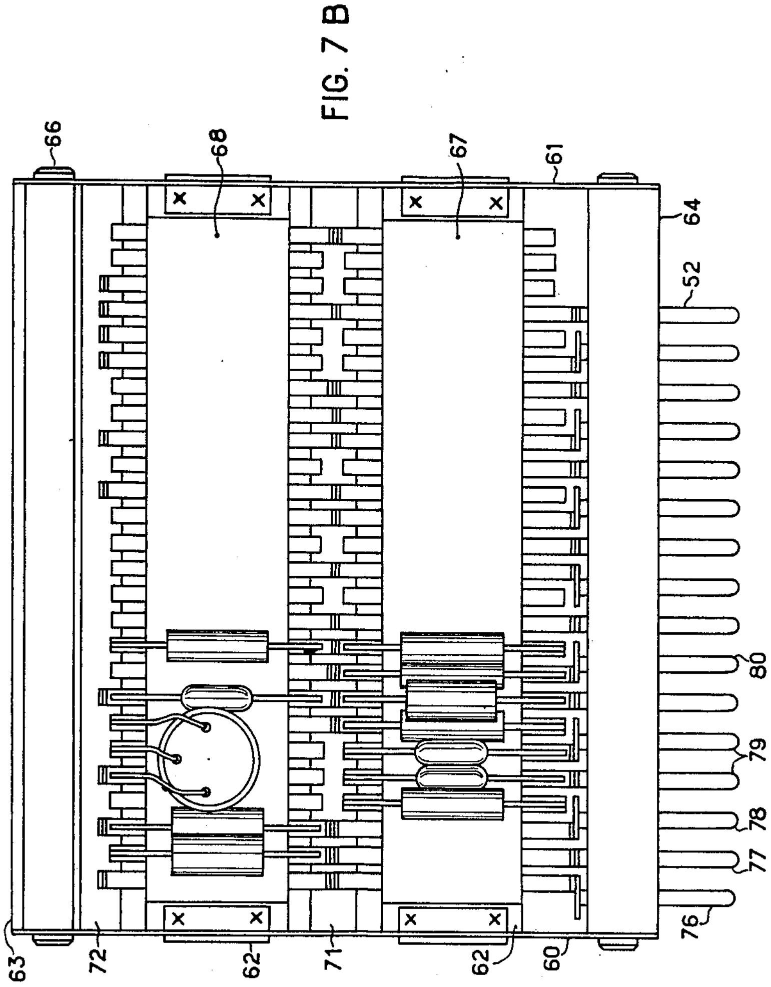
Figure 9A:
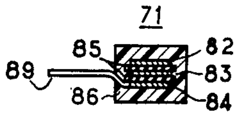
Figure 9B:
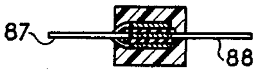
Figure 9:
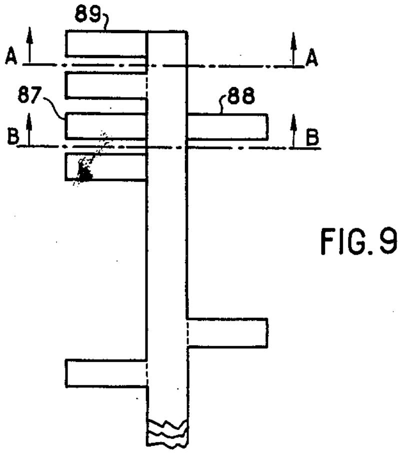
Figure 8:
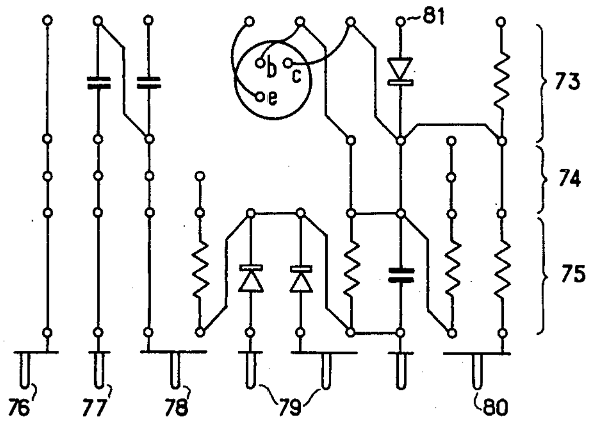

For a better understanding of the invention and the manner in which it may be carried into effect, the same will now be described by way of example, with reference to the accompanying drawings, in which:

FIGURES 1 and 2 illustrate a simplified constructional form of a modular package unit, FIGURE 3 illustrates a grid or lattice of standardised form, FIGURE 4 is a circuit diagram which can be constructed with the unit illustrated in FIGURES 1 and 2, FIGURES 5A, 5B, 5C, 6A and 6B are views of a modular package unit according to a preferred embodiment, FIGURES 7A, 7B and 7C are three views of an example of a modular block or package, FIGURE 8 is a circuit diagram of a functional device such as may be employed on a part of a modular block or package, and FIGURES 9, 9A and 9B are detailed views of a busbar block.

In order to obtain a general idea of the form of a compact block or package, a rapid glance at FIGURES 7A, 7B and 7C is recommended. There will now be considered FIGURES 1, 2 and 3, which give an outline of a modular package unit, and with reference to which a preferred process of production can be described.

FIGURE 1 is an end view of a modular package unit. The modular package unit comprises a set of strips 10 which are bent into U shape to provide a central unbent part or web 11 and side limbs having portions which are further bent over into a plane parallel to the web. The width of the U thus formed must be sufficient to receive cylindrical components, the maximum length of which is known. Account will also be taken of the minimum length of the wires to be welded. The bent-over portions are very favourable to electric welding of the wires of the electric components, as illustrated in dash-dotted lines at 12.

The set of strips is obtained from a grid or lattice 30 (FIGURE 3).

The lattice is formed of a sheet of copper, or of a copper-tin-zinc alloy, the sheet being, for example, 0.3 mm. thick. Elongated apertures 31 are cut into the latter, as also shorter apertures 32, on opposite sides of an axis of symmetry 33. This axis corresponds to the centre of the web 11. A lattice for a modular unit may comprise 26 strips 34, aligned with a uniform pitch.

The grid or lattice 30, as illustrated in FIGURE 3, is subjected to a shaping or bending operation in a press in order to impart to the central portion the form shown in FIGURE 1. Thereafter, tongues are cut out either manually or by means of a cutting tool in the press.

An example of the cutting-out is shown in FIGURE 2, this modular unit portion being designed to effect the electric wiring as shown in FIGURE 4. There will be seen from FIGURE 2, the strips, of which the ends are marked 1*a* to 9*a*, and 1*b* to 9*b*. The black rectangles of FIGURE 2 represent cuts made in the junction tongues. It will be seen that cuts in the strips may be made either level with the axis of symmetry 33 or above a longitudinal link 21, or again below a longitudinal link 22. Other cuts may be made in the longitudinal links 21 and 22 in order to separate the adjacent strips.

It is clear that each time a component, such as a resistance, condenser, diode, or the like, is to be welded to the opposite ends of a strip, a cut must be made in the strip. In FIGURE 2, the strips *1a–1b*, *2a–2b* and *3a–3b* are not interrupted, because it is assumed that they serve to transmit the feed voltages. Examination of FIGURES 2 and 4 will show, for example, that cuts have been made in such manner that an electric connection is established between the ends *4b*, *5a*, *6b*, *7b* and *8b*, of the strips in accordance with the circuit diagram of FIGURE 4.

When the cuts have been made in the central web of a modular unit, the latter is reinforced by means of two sheets 13 and 14 of an insulating material, of the bakelised board type. The two sheets are stuck and polymerised at elevated temperature on the strips, which again have reciprocal connections, since the ends such as 35 of the lattice 30 (FIGURE 3) have not yet been cut. It is to be noted that FIGURE 2 shows only the sheet 13, the sheet 14 being assumed to have been removed.

Although a modular unit according to FIGURES 1 and 2 may be used as such by extending certain ends of the strips, a preferred construction will now be considered with reference to FIGURES 5A, 5B and 5C.

In addition to the above-indicated bends, the extremities of the strips are again bent-over in U-form so as to project away from the web. In addition, the welding surfaces 50 are not all in the same plane. In the case of one half of the strips, for example those of odd order, the dimension *h* is sufficient for the cylindrical components of largest diameter to be inscribed in the bent profile without deformation of their wires. In the case of the other strips, i.e. those of even order, the dimension H exceeds the dimension *h* by 3 mm. As may be seen from FIGURE 5C, the cylindrical components are disposed in staggered relationship in order that the horizontal distance between the axes of the components may be reduced. Thus, the pitch of the strips may be reduced to 2.5 mm.

The length of the extremities 51 must be sufficient to enable them to be welded, if necessary, to a plug pin 52. When such a weld has not to be effected, the extremities 51 are cut before the second bending at a right angle, as shown at 53 in FIGURE 5B.

FIGURES 6A and 6B clearly show how the wires of a transistor 54 are welded to the strips. It may be seen that from 5 to 6 strip pitches are necessary for positioning this transistor. A wafer 55 of insulating material is provided with three holes for the passage of the emitter, base and collector wires, in order to ensure insulation thereof.

It will be seen on reference to FIGURES 7A, 7B and 7C how a number of units are assembled to form a detachable block of components. It is to be noted that it is proposed to group a number of circuits of a particular type in one block. For example a block will be composed of two bistable trigger circuits, each comprising two transistors and its logical input circuits. Another block may be composed of six amplifiers, each comprising a transistor with its logical circuits for performing the "OR" and "inversion" functions.

The structure for the mounting of a block comprises essentially the side pieces 60, 61 of cadmium-plated copper, two cross members 62, also of copper, the upper longitudinal member 63 and the lower longitudinal member 64, the latter members consisting of thermosetting resin of the "Araldite" type. During the moulding of the lower longitudinal member 64, the plug pins 52 are inserted to form two parallel rows.

During assembly, the ends of the cross members, as also the studs 66 of the longitudinal members are introduced into the corresponding apertures in the side pieces 60, 61. When the members are maintained in position, the ends of the cross members 62 are electrically welded to lugs cut out of the side pieces 60, 61 and bent over at a right angle.

In accordance with the example illustrated in FIGURE 7A, a compact block comprises four modular units 67, 68, 69 and 70. It will be seen that the units 67 and 69 forming what will be called the "lower stage" are positioned on either side of the lower cross member 62. The units 68, 70, which are also symmetrically positioned, form the "upper stage." A bus-bar block 71 is disposed between the lower stage and the upper stage, and a bus-bar block 72 is disposed above the upper stage. In the left-hand part of the block illustrated in FIGURE 7B are shown the components corresponding to an amplifier-inverter associated with an OR circuit, in accordance with the circuit diagram illustrated in FIGURE 8.

Generally speaking, the diodes and resistances of the input circuits are situated in a unit of the lower stage, while the transistor or transistors are situated on a unit of the upper stage. In FIGURE 8, the braces 73, 75 are disposed at the levels of the upper and lower stages respectively, while the brace 74 is situated at the level of the connections welded to the lugs of the bus-bars, as will be explained in greater detail in the following. Voltage is applied to the block through the pin 76, which receives the voltage −8 volts, the pin 77 which receives +2 volts, and the pin 78 which receives the voltage 0 volt. Another pin not shown applies the voltage −3 volts to the terminal 81 by means of one of the bus-bars of 72.

The two pins 79 correspond to the input terminals, and the pin 80 corresponds to the output terminal of an amplifier of the "NOR" type.

Reference will now be made to FIGURES 9, 9A and 9B. Three bus-bars 82, 83, 84 are assembled to form the bus-bar block 71. Each bar is cut out from a copper sheet 0.3 mm. thick. They are seperated by two sheets 85 of an insulating material 0.2 mm. thick. These parts form a solid whole when they are bedded in a moulding 86 of insulating material such as transparent Araldite. The bus-bars bear side lugs at the required points. For example, the centre bar 83, which serves to distribute the voltage 0 volt, comprises (section B–B in FIGURE 9B) a plane lug 87, 88 on either side level with the third strip from the left (between the elements 67 and 68 in FIGURE 7B). The lugs provided on the bars 82 and 84 are dog-legged so that they are situated on the same plane as the lugs of the centre bar 83. For example, the lower bar 84, which serves to distribute the voltage −8 volts, comprises (section A—A in FIGURE 9A) a lug 89 level with the first and fourth strips from the left.

With a view to the final assembly operation, the two bus-bar blocks 71 and 72 are first positioned, and then the modular units 67 and 70 on a previously prepared block structure. It then remains only to perform the electric welding of the ends of the strips and of the bus-bar lugs situated one above the other. Thus, as may be seen from FIGURE 7B, at the level of the unit 71, there may be either three thicknesses of 0.3 mm. to be welded, i.e. one lug between two strip ends, or two thicknesses at the points at which there remain two strip ends one above the other. The bent-over horizontal portions of the plug pins are also electrically welded to the strip ends which remain in the units of the lower stage.

The rigid assembly thus obtained is thereafter protected from shock and dust when the two casings 90 of moulded plastic material are mounted (FIGURE 7A).

The process for the economical production of a modular unit may be summarised as follows:

(a) Cutting-out of the standard grid or lattice in the press.

(b) Pickling and protection, for example by gilding.

(c) Bending-folding into the form of a U.

(d) Cutting-out of the tongues in the zone of the central portion of the web, either with the aid of a punching pattern for manual punching on a punching die, or on a punching press tool, with a mechanism for the step-by-step advance and selection of the punches in accordance with a programme depending upon the unit.

(e) Positioning and adhesive securing of the insulating and reinforcing sheets of the web of the unit.

(f) Cutting-out of the two outer portions of the grid or lattice flush with the ends of the strips, all having their maximum length.

(g) Cutting-out of those ends of the strips which will be welded only to the wires of the components.

(h) Electric welding of the components on an electric welding machine, where necessary with a step-by-step advance mechanism and a mechanism for the distribution of the components at the welding station in accordance with a pre-set programme.

(i) Electric welding of the wires of the transistors with manual preparation.

It will be obvious that the scope of the invention is in no way limited by the dimensions hereinbefore indicated or by the constructional details which have been shown by way of example in the accompanying drawings.

What is claimed is:

1. A modular package unit comprising electronic components and having plug pins for establishing circuits including such components, said unit further comprising a substantially symmetrical metal grid formed from a single foil and having parallel strips spaced from one another transversely to their longitudinal extents with elongated apertures intervening therebetween but being connected by two sets of links comprised in said grid and being respectively on opposite sides of the axis of symmetry of said grid transverse to said strips, said strips having portions defining a web and other portions providing side limbs extending at angles from edges of said web on opposite sides of said axis of symmetry, said web and said side limbs being bent into a substantially U-shaped structure, said side limbs further emerging remotely from said web with end parts extending generally parallel to said web to provide welding surfaces to which component wires are welded, said web being formed with first slots in the central portions of certain of said strips adjacent said axis of symmetry and with second slots in certain of said links; and an insulating plate adhered to said web.

2. A modular package unit according to claim 1 wherein said end parts have extremities extending beyond said welding surfaces, substantially perpendicularly to the plane of the web so as to extend away from said web.

3. A modular package comprising at least two package unit according to claim 2, including mounting means and also a frame member in which are embedded two series of plug pins, each plug pin having an L-bent lug welded to extremities of appropriate strips, in order to form input, output and voltage feeding terminals for the package.

4. A modular package according to claim 3, wherein said mounting means comprise another frame member, a central strut member between said package units, and two side plates secured to the extremities of said frame members and said central strut member.

5. A modular package according to claim 4, wherein a bus-bar block is located over said two package units, said bus-bar including several insulated longitudinally extending conductive strips fitted with transverse lugs welded with corresponding strip ends.

6. A modular package unit comprising electronic components and having plug pins for establishing circuits including such components said unit further comprising, a substantially symmetrical metal grid formed from a single thin foil and having parallel strips spaced from one another transversely to their longitudinal extents with elongated apertures intervening therebetween but being connected by two sets of links comprised in said grid and being respectively on opposite sides of the axis of symmetry of said grid transverse to said strips, said strips having portions defining a web and other portions providing side limbs extending at angles from edges of said web on opposite sides, of said axis of symmetry, said web and said side limbs being bent into a substantially U-shaped structure, said side limbs further emerging remotely from said web with end parts extending generally parallel to said web to provide welding surfaces to which component wires are welded, the end parts of adjacent strips being disposed at different distances from said web to provide spaced rows of welding surfaces with the surfaces in adjacent rows staggered with respect to one another, said web being formed with first slots in the central portions of certain of said strips adjacent said axis of symmetry and with second slots in certain of said links; and an insulating plate adhered to said links; and an insulating plate adhered to said web.

7. A modular package unit according to claim 6 wherein said end parts have extremities extending beyond said welding surfaces, substantially perpendicularly to the plane of the web so as to extend away from said web.

8. A modular package comprising at least two package units according to claim 7, including mounting means and also a frame member in which are embedded two series of plug pins, each plug pin having an L-bent lug welded to extremities of appropriate strips, in order to form input, output and voltage feeding terminals for the package.

9. A modular package according to claim 8, wherein said mounting means comprise another frame member, a central strut member between said package units, and two side plates secured to the extremities of said frame members and said central strut member.

10. A modular package according to claim 9, wherein a bus-bar block is located over said two package units, said bus-bar including several insulated longitudinally extending conductive strips fitted with transverse lugs welded with corresponding strip ends.

11. A modular package unit comprising electronic components for establishing pre-determined circuits, one single sheet of metal which forms a substantially symmetrical grid, said grid consisting of two sets of links disposed respectively on opposite sides of the axis of symmetry of said grid, and of a set of parallel strips extending perpendicularly to the direction of said links and spaced according to a uniform pitch, said strips being bent in a U-shaped form to form with said links a central unbent web part, and side limbs extending at angles from said web on opposite sides of said axis of symmetry, the ends of said strips being further folded over remotely and substantially parallel to said web to form welding surfaces to which component wires are welded, said web being provided with first slots in certain of said strips only in the central part of said strips comprised between said links, with second slots in certain portions of said links between said strips, and at least one insulating plate adhered to said web.

References Cited by the Examiner

UNITED STATES PATENTS

| | | | |
|---|---|---|---|
| 2,911,572 | 11/1959 | Francis et al. | |
| 2,977,672 | 4/1961 | Telfer | 174—68.5 X |
| 2,994,844 | 8/1961 | Neiderman | 174—52.6 X |
| 3,059,320 | 10/1962 | Seabury et al. | 174—68.5 |
| 3,118,016 | 1/1964 | Stephenson | 174—68.5 |

OTHER REFERENCES

Mattox: "Machine Produces Matrices For Modules," published in Electronics, June 30, 1961, pages 108, 110 and 111.

ROBERT K. SCHAEFER, *Primary Examiner.*

DARRELL L. CLAY, JOHN F. BURNS, *Examiners.*